(12) United States Patent
Yu

(10) Patent No.: US 8,926,115 B2
(45) Date of Patent: Jan. 6, 2015

(54) BACKLIGHT DEVICE, BACKLIGHT SYSTEM, AND FLAT PANEL DISPLAY DEVICE

(75) Inventor: Gang Yu, Guandong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 151 days.

(21) Appl. No.: 13/522,327

(22) PCT Filed: Jun. 26, 2012

(86) PCT No.: PCT/CN2012/077520
§ 371 (c)(1),
(2), (4) Date: Jul. 15, 2012

(87) PCT Pub. No.: WO2013/185376
PCT Pub. Date: Dec. 19, 2013

(65) Prior Publication Data
US 2013/0336006 A1 Dec. 19, 2013

(30) Foreign Application Priority Data
Jun. 13, 2012 (CN) .......................... 2012 1 0194851

(51) Int. Cl.
*G09F 13/04* (2006.01)
*G02F 1/1335* (2006.01)
*F21V 8/00* (2006.01)

(52) U.S. Cl.
CPC ...... *G09F 13/0413* (2013.01); *G02F 1/133603* (2013.01); *G02B 6/0083* (2013.01)
USPC .......................... 362/97.3; 362/97.1; 362/630

(58) Field of Classification Search
CPC .............. G09F 13/0413; G02B 6/0083; G02F 1/133602; G02F 1/133603; G02F 1/133604; G02F 1/133608
USPC ................. 362/97.1, 97.3, 630, 633
See application file for complete search history.

(56) References Cited

U.S. PATENT DOCUMENTS

| | | | | |
|---|---|---|---|---|
| 5,020,253 | A * | 6/1991 | Lie et al. .......................... | 40/576 |
| 5,914,698 | A * | 6/1999 | Nicholson et al. .............. | 345/1.3 |
| 6,314,669 | B1 * | 11/2001 | Tucker .............................. | 40/448 |
| 8,486,761 | B2 * | 7/2013 | Bierhuizen .................... | 438/111 |
| 2007/0103939 | A1 * | 5/2007 | Huang et al. .................. | 362/633 |

* cited by examiner

*Primary Examiner* — Peggy Neils
(74) *Attorney, Agent, or Firm* — Andrew C. Cheng

(57) ABSTRACT

The present invention introduces a backlight device, a backlight system, and a flat panel display device incorporated with the backlight device. The backlight device is configured by at least two backlight units detachably and electrically interconnected. The backlight unit comprises at least first and second leadframes each including longitudinal first and second ends and an intermediate portion located between the ends. A light emitting device is disposed at the intermediate portion. And at least a pair of first and seconds leads with the first pair of leads arranged at the first end, and the second pair of leads located at the second end. The backlight, backlight system, and the flat panel display device can be readily lengthened or shortened according to the field requirements. It features a simple configuration, while is easy to assemble, and is beneficial to cost down.

10 Claims, 3 Drawing Sheets

BACKLIGHT DEVICE, BACKLIGHT SYSTEM, AND FLAT PANEL DISPLAY DEVICE

FIELD OF THE INVENTION

The present invention relates to a technical field of display, and more particularly to a backlight device, backlight system, and a flat panel display device.

DESCRIPTION OF PRIOR ART

Currently, an LED backlight is directly soldered onto a leadframe. In general, the length of the leadframe and the number of LED to be used are predetermined according to design requirements, such as dimension of the display. In case there is a modification or alternation in length of the leadframe or the number of the LED, then the leadframe has to be changed to the new design accordingly so as to accommodate the LED and fits into the design of a new display. This will inevitably push back the delivery date, as well as waste the material used for the original leadframe.

It is therefore a backlight, backlight system, and a flat panel display device so as to resolve the prior art problems such that a length of a leadframe can be readily lengthened or shortened according to field requirements.

SUMMARY OF THE INVENTION

It is the purpose of the present invention to introduce a technical solution to provide a backlight device, a backlight system, and a flat panel display device. The backlight device, backlight system, and the flat panel display device can be lengthened with additional backlight units, or shortened by removing unwanted backlight units readily as it features a simplified configuration.

In order to resolve the prior art problems, the present invention introduces a technical solution by providing a backlight device, wherein the backlight device is configured by at least two backlight units detachably and electrically interconnected. The backlight unit comprises at least first and second leadframes each including longitudinal first and second ends and an intermediate portion located between the ends. A light emitting device is disposed at the intermediate portion. And at least a pair of first and seconds leads with the first pair of leads arranged at the first end, and the second pair of leads located at the second end.

Wherein each of the first and second leadframes has a rectangular shape, and the juxtaposed backlight units are electrically interconnected along the longitudinal direction of the leadframe.

Wherein the first end of the leadframe is arranged with a first coupler, and the second end of the leadframe is arranged with a second coupler capable of interconnecting with the first coupler, wherein the two backlight units are electrically interconnected by the first coupler of a first leadframe, and a second coupler of a second leadframe coupled with the first coupler.

Wherein the first coupler is a retaining slot, and the second coupler is a wedge capable of coupling with the retaining slot, wherein those two backlight units are electrically coupled by the engagement of the wedge and the retaining slot.

Wherein the backlight device further includes a connector with a first end electrically connected to a first end of the first leadframe, and a second end electrically connected to a second end of the second leadframe so as to electrically interconnect the backlight units juxtaposed together.

Wherein the connector is made from anisotropic conductive material.

Wherein the connector includes an adhesive tape, and a layer of conductive material deployed over the tape.

Wherein the light emitting material is a light emitting diode.

In order to resolve the prior art problems, the present invention introduces a technical solution by providing a backlight system, wherein the backlight system is configured by at least two backlight units detachably and electrically interconnected. The backlight unit comprises at least first and second leadframes each including longitudinal first and second ends and an intermediate portion located between the ends. A light emitting device is disposed at the intermediate portion. And at least a pair of first and seconds leads with the first pair of leads arranged at the first end, and the second pair of leads located at the second end.

Wherein the backlight device further includes a connector with a first end electrically connected to a first end of the first leadframe, and a second end electrically connected to a second end of the second leadframe so as to electrically interconnect the backlight units juxtaposed together.

Wherein the connector is made from anisotropic conductive material.

Wherein the connector includes an adhesive tape, and a layer of conductive material deployed over the tape.

Wherein the light emitting material is a light emitting diode.

Wherein the first end of the leadframe is arranged with a first coupler, and the second end of the leadframe is arranged with a second coupler capable of interconnecting, with the first coupler, wherein the two backlight units are electrically interconnected by the first coupler of a first leadframe, and a second coupler of a second leadframe coupled with the first coupler.

In order to resolve the prior art problems, the present invention introduces a technical solution by providing a flat panel display device, wherein the flat panel display device is configured by at least two backlight units detachably and electrically interconnected. The backlight unit comprises at least first and second leadframes each including longitudinal first and second ends and an intermediate portion located between the ends. A light emitting device is disposed at the intermediate portion. And at least a pair of first and seconds leads with the first pair of leads arranged at the first end, and the second pair of leads located at the second end.

Wherein the backlight device further includes a connector with a first end electrically connected to a first end of the first leadframe, and a second end electrically connected to a second end of the second leadframe so as to electrically interconnect the backlight units juxtaposed together.

Wherein the connector is made from anisotropic conductive material.

Wherein the connector includes an adhesive tape, and a layer of conductive material deployed over the tape.

Wherein the light emitting material is a light emitting diode.

Wherein the first end of the leadframe is arranged with a first coupler, and the second end of the leadframe is arranged with a second coupler capable of interconnecting with the first coupler, wherein the two backlight units are electrically interconnected by the first coupler of a first leadframe, and a second coupler of a second leadframe coupled with the first coupler.

The present invention can be concluded with the following advantages: as compared to the prior art, the backlight units incorporated into the backlight device, backlight system, and the flat panel display device can be lengthened with additional backlight units, or shortened by removing unwanted backlight units readily as it features a simplified configuration. The installation as well as assembly are convenient, while the cost is comparatively low.

BRIEF DESCRIPTION OF DRAWINGS

In order to give a better and thorough understanding to the whole and other intended purposes, features and advantages of the technical solution of the present invention, detailed description will be given with respect to preferred embodiments provided and illustrated herebelow in accompanied drawings. Apparently, with the spirit of the embodiments disclosed, person in the skilled in the art can readily come out with other modifications as well as improvements without undue experiment. In addition, other drawings can be readily achieved based on the disclosed drawings.

DETAILED DESCRIPTION OF PREFERRED EMBODIMENTS

Detailed description in view of preferred embodiments will be given herebelow with accompanied drawings.

Figure 1:
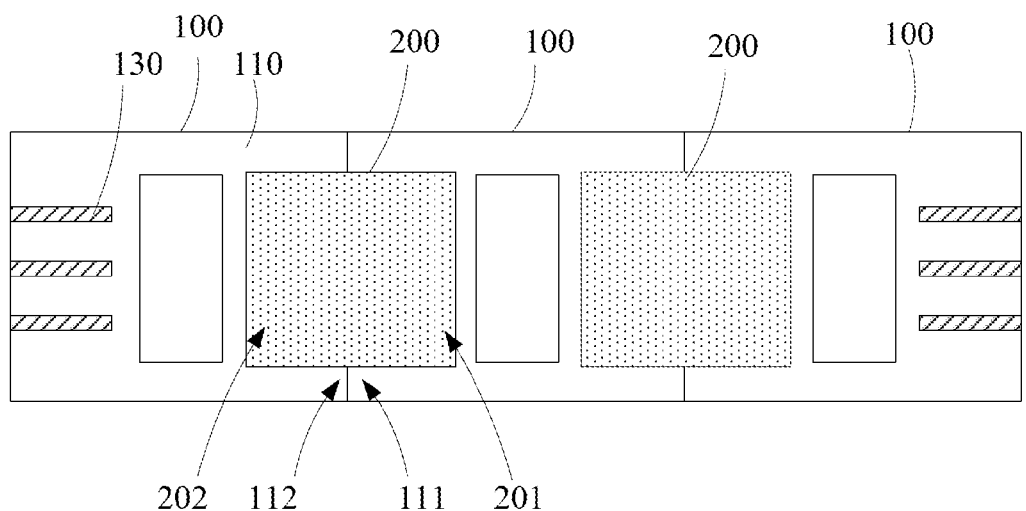
FIG. 1 is an illustrational and structural view of a backlight device made in accordance with the present invention.

FIG. 1 is an illustrational and structural view of a backlight device made in accordance with the present invention. As shown, a backlight device 10 is detachably configured with at least two or first and second backlight unit 100. In this preferred embodiment, the backlight device 10 is configured with first and second backlight units 100, and a connector 200.

Figure 2:
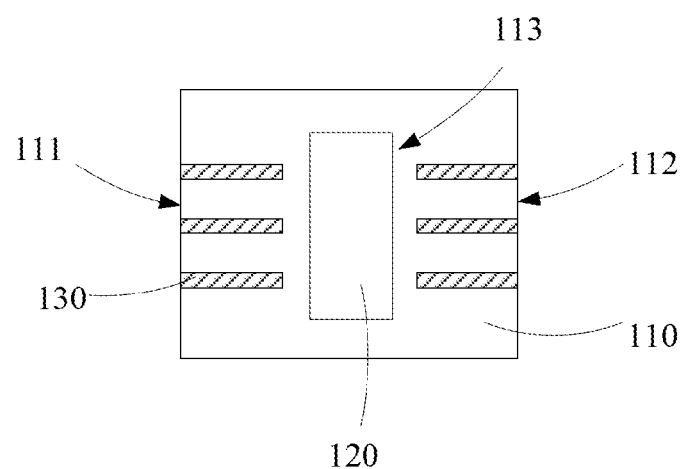
FIG. 2 is an illustrational and structural view of leadframes of the backlight device made in accordance with a first embodiment of the present invention.

FIG. 2 is an illustrational and structural view of leadframes of the backlight device made in accordance with a first embodiment of the present invention. As shown, the backlight unit 100 includes a leadframe 110, a light emitting device 120, and at least a pair of leads 130.

The leadframe 110 includes first and second ends 111, 112, and an intermediate portion 113 located between the first and second ends 111, 112. The first and second ends 111, 112 is arranged with portions for arranging leads. The intermediate portion 113 is for installation of light emitting device 120. Each of the first and second ends 111, 112 of the leadframe 110 is arranged with a pair of leads 130. The light emitting device 120 is arranged onto the intermediate portion 113 of the leadframe 110. In this embodiment, the light emitting device 120 is a light emitting diode (LED).

The leadframe 110 can be dimensioned to accommodate with estate only needed for light emitting device 120 and the pair of leads 130. No special machining is required. In this preferred embodiment, the leadframe 110 has a rectangular shape, and two juxtaposed backlight units 100 can be electrically interconnected along the longitudinal direction of the leadframe 110.

Referring again to FIG. 1, the backlight device 10 utilizes the connector 200 to interconnect the backlight units 100. As described, the backlight units 100 are detachably interconnected. As a result, the purpose of the present invention is realized by the detachable interconnection between the backlight units 100. Substantially, a first end 201 of the connection 200 is electrically connected to a first end 111 of the first leadframe 110 of the backlight unit 100, while the second end 202 of the connector 200 is electrically interconnected to a second end 112 of the second leadframe 110. By this arrangement, the first and second leadframes 110 of the backlight unit 100 can be detachably interconnected.

In the current embodiment, the connector 200 is made from anisotropic conductive material. Because that the anisotropic conductive material can be drawn to very thin, it will not affect the optical quality of the backlight module. Of course, in other embodiment, the connector 200 can be implemented by way of connecting tape and deploying a layer of conducting material over the tape. The connecting tape can be deployed to interconnect the first and second ends 111, 112 of those juxtaposed leadframes 110. By the conductive material arranged above and the leads 103 on the leadframe 110, the backlight units 100 can be detachably interconnected.

Figure 3:
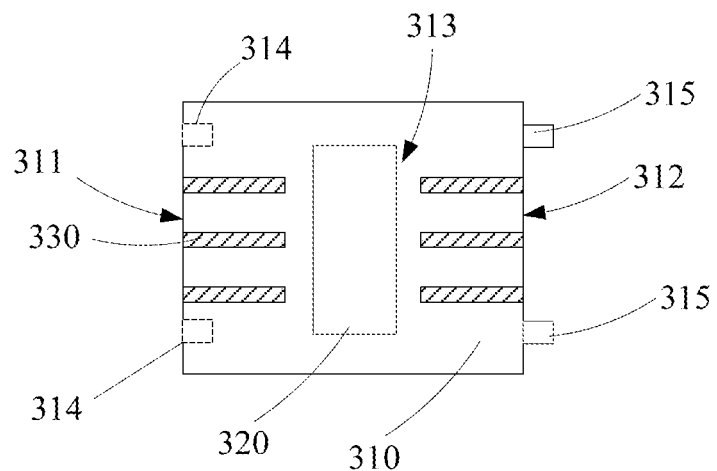
FIG. 3 is a front view of a leadframe of a backlight device made in accordance with a second embodiment of the present invention.
Figure 4:
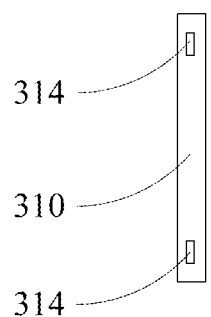
FIG. 4 is a left elevational view of the leadframe of the backlight unit shown in FIG. 3.

FIG. 3 is a front view of a leadframe of a backlight device made in accordance with a second embodiment of the present invention, and FIG. 4 is a left elevational view of the leadframe of the backlight unit shown in FIG. 3. As shown in FIGS. 3 and 4, a backlight unit 300 generally includes a leadframe 310, a light emitting device 320 and a pair of leads 330. The leadframe 310 includes first and second ends 311, 312, and an intermediate portion 313 arranged between the first and second ends 311, 312. Basically, the first and second ends 311, 312, the immediate portion 313, the light emitting device 320, and the pair of leads 330 are identical to the first and second ends 111, 112, the immediate portion 113, the light emitting device 120, and the pair of leads 130 of the backlight unit 100, accordingly, no detailed description is given herebelow.

In the present embodiment, in order to enhance the mechanical connectivity between the backlight units 300, at least a first coupler 314 is arranged on the first end 311 of the leadframe 310, and the second coupler 315 is arranged at the second end 312 of the leadframe 310. The first and second couplers 314 and 315 are engageable when come together. Accordingly, a first coupler 314 of the first backlight unit 300, can readily and detachably interengage with a second coupler 315 of the second backlight unit 300.

In this embodiment, the first coupler 314 is two retaining slots, while the second coupler 315 is two wedges capable of engaging with the retaining slots 314. By the interengagement between the wedges and the retaining slots, the juxtaposed backlight units 300 can be assembled together.

Figure 5:
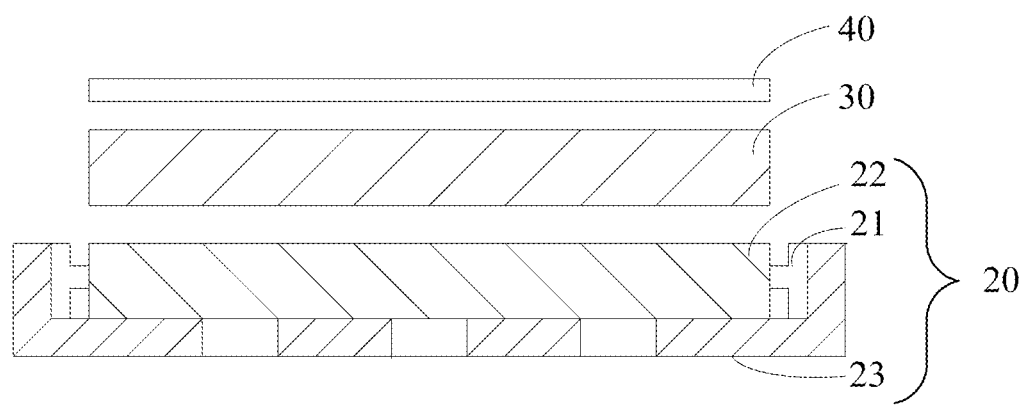
FIG. 5 is an illustrational and structural view of a flat panel display device made in accordance with the present invention.

FIG. 5 is an illustrational and structural view of a flat panel display device made in accordance with the present invention. As shown, the present invention further provides a flat panel display device 50 incorporated with the backlight system 20. Wherein the flat panel display device 50 includes the backlight system 20, a display panel 30, and a touch-screen 40. Wherein the backlight system 20 is arranged behind the display panel 30 to provide a light source to the display panel 30.

The backlight system 20 includes a backlight device 21, a light distributor 22, and a backframe 23. The backframe 23 is used as a chassis to carry the backlight device 21, and the diffuser 22. If the backlight system 20 is side-emitting-style, then the light distributor 22 is a waveguide; if the backlight system 20 is a direct-emitting-style, then the light distributor 22 is a diffuser. The light distributer of the backlight unit 21 can be implemented with any one of the above described configuration.

The flat panel display panel 50 can also be used for liquid crystal display device or liquid crystal television.

By the disclosure described above, the backlight, backlight system, and the flat panel display device can be readily lengthened or shortened according to the field requirements. It features a simple configuration, while is easy to assemble, and is beneficial to cost down.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

The invention claimed is:

1. A backlight device, wherein the backlight device is configured by at least two backlight units detachably and electrically interconnected, each of the backlight units comprising:
   a leadframe including longitudinal first and second ends and an intermediate portion located between the first and second ends;
   a light emitting diode disposed at the intermediate portion;
   a first pair of leads arranged at the first end of the leadframe, and a second pair of leads arranged at the second end of the leadframe;
   wherein the first end of the leadframe is arranged with a first coupler, and the second end of the leadframe is arranged with a second coupler capable of interconnecting with a first coupler of an adjacent leadframe, wherein the two backlight units are electrically interconnected by the first coupler and a second coupler of the adjacent leadframe coupled with the first coupler;
   wherein the first coupler is a retaining slot, and the second coupler is a wedge capable of coupling with the retaining slot, wherein those two backlight units are electrically coupled by the engagement of the wedge and the retaining slot; and
   wherein the backlight device further includes a connector with a first end electrically connected to a first end of the first leadframe, and a second end electrically connected to a second end of the second leadframe so as to electrically interconnect the backlight units juxtaposed together.

2. The backlight device as recited in claim 1, wherein the leadframe has a rectangular shape, and which can be electrically interconnected along the longitudinal direction of the leadframe.

3. The backlight unit as recited in claim 1, wherein the connector is made from anisotropic conductive material.

4. The backlight device as recited in claim 1, wherein the connector includes an adhesive tape, and a layer of conductive material deployed over the tape.

5. A backlight system, wherein the backlight system includes a backlight device which is configured by at least two backlight units detachably and electrically interconnected, each of the backlight units comprising:
   a leadframe including longitudinal first and second ends and an intermediate portion located between the first and second ends;
   a light emitting diode disposed at the intermediate portion;
   a first pair of leads arranged at the first end of the leadframe, and a second pair of leads arranged at the second end of the leadframe;
   wherein further includes a connector with a first end electrically connected to a first end of the first leadframe, and a second end electrically connected to a second end of the second leadframe so as to electrically interconnect the backlight units juxtaposed together; and
   wherein the first end of the leadframe is arranged with a first coupler, and the second end of the leadframe is arranged with a second coupler capable of interconnecting with the first coupler, wherein the two backlight units are electrically interconnected by the first coupler of a first leadframe, and a second coupler of a second leadframe coupled with the first coupler.

6. The backlight system as recited in claim 5, wherein the connector is made from anisotropic conductive material.

7. The backlight system as recited in claim 5, wherein the connector includes an adhesive tape, and a layer of conductive material deployed over the tape.

8. A flat panel display device, wherein the flat panel display panel includes a backlight device which is configured by at least two backlight units detachably and electrically interconnected, each of the backlight units comprising:
   a leadframe including longitudinal first and second ends and an intermediate portion located between the first and second ends;
   a light emitting device disposed at the intermediate portion;
   a first pair of leads arranged at the first end of the leadframe, and a second pair of leads arranged at the second end of the leadframe;
   wherein further includes a connector with a first end electrically connected to a first end of the first leadframe, and a second end electrically connected to a second end of the second leadframe so as to electrically interconnect the backlight units juxtaposed together; and
   wherein the first end of the leadframe is arranged with a first coupler, and the second end of the leadframe is arranged with a second coupler capable of interconnecting with the first coupler, wherein the two backlight units are electrically interconnected by the first coupler of a first leadframe, and a second coupler of a second leadframe coupled with the first coupler.

9. The flat panel display device as recited in claim 8, wherein the connector is made from anisotropic conductive material.

10. The flat panel display device as recited in claim 8, wherein the connector includes an adhesive tape, and a layer of conductive material deployed over the tape.

* * * * *